March 15, 1960

J. H. HAINES 2,928,317

TRANSPARENT CONDUCTIVE SURFACE WITH
TRAVELLING WAVE PROPERTIES

Filed July 27, 1956

INVENTOR.
JESSE H. HAINES
BY
*Darby & Darby*
ATTORNEYS

INVENTOR.
JESSE H. HAINES
BY
Darby + Darby
ATTORNEYS

United States Patent Office 2,928,317
Patented Mar. 15, 1960

2,928,317

TRANSPARENT CONDUCTIVE SURFACE WITH TRAVELLING WAVE PROPERTIES

Jesse H. Haines, Clifton, N.J., assignor to Allen B. Du Mont Laboratories, Inc., Clifton, N.J., a corporation of Delaware Application July 27, 1956, Serial No. 600,608

6 Claims. (Cl. 88—61)

This invention relates to an electro-optic phase shifting device such as, for example, the color filter disclosed in my copending application Serial No. 329,036, entitled "Electronic Filter," filed December 31, 1952, now Patent No. 2,753,763, and assigned to the same assignee as the instant application.

A key element in filters of the type disclosed in my copending application just referred to is the electro-optic plate by means of which the plane of polarized light is rotated. Such plates are commonly made of PN crystalline material which is an optically active material. That is, a slap of PN crystalline cut perpendicularly to the Z axis of the original crystalline material and provided with transparent electrodes covering the opposite faces of the slab will not affect the plane of polarization of light passing through the slab along the direction of the Z axis when the electrodes are not energized and will rotate the plane of polarization through 90° when the electrodes are energized with a potential of sufficient magnitude.

The electrical circuit presented by the conductive coating may be visualized as that of a simple flat plate condenser in which the dielectric consists of the electro-optic substance. In the case of PN crystals the shunt resistance of the crystal is many hundreds of megohms per square inch for a $\frac{1}{16}$-inch thickness. As will be seen later, this resistance is considerably greater than the surface resistance of available transparent coatings. Consequently the shunt resistance of the electro-optic sheet will be neglected in this analysis. Thus, the two electrical parameters that determine the behavior of the electro-optic element are the capacity between the two conductive coatings and the resistance of the surface. The capacity of the coatings may be readily computed from the dimensions and the dielectric constant of the electro-optic sheet. Transparent conductive coatings have been produced with resistances of from a few hundred ohms/square to many megohms/square.

One of the objects of the invention is to provide an improved electro-optic light polarization rotator.

Other objects are to provide an electro-optic light polarization rotator of relatively large area and of such a nature as to be used in the form of a travelling wave or focal plane shutter.

Further objects will be apparent from a study of the following specification, together with the drawings in which.

Figure 1:
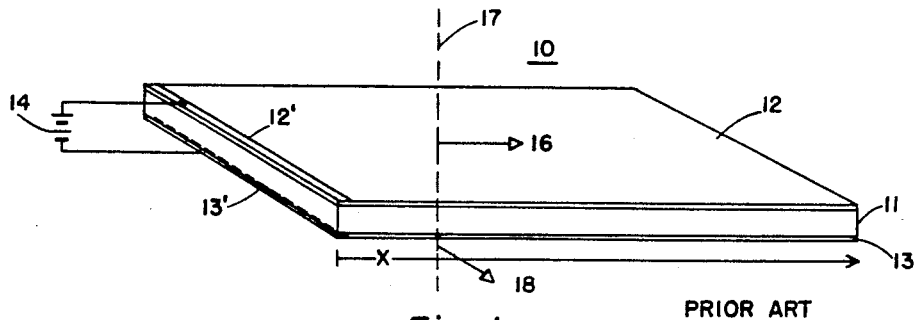
Figure 1 shows an electro-optic light polarization rotator.

In Figure 1 the light polarization rotator consists of a slab 11 of electro-optic material such as, for example, PN crystals. On the upper side of the crystal slab 11 is a transparent conductive layer or coating 12 and on the lower side is a second transparent conductive coating 13. Coatings 12 and 13 are electrodes by means of which the crystalline material forming slab 11 is energized. The energizing potential is indicated by reference character 14 and, as indicated in my copending application, Serial No. 329,036, now Patent No. 2,753,763, has a total operating potential of approximately 9,500 volts. Connections to the coatings 12 and 13 are made by strips 12' and 13' of a highly conductive material such as silver, not usually transparent. In fact, in prior art shutters, it has been customary to provide such a strip around the circumference of the layers applied to the electro-optic material, as is done here around layer 42 of Fig. 4.

The operation of the light polarization rotator 10 is well known in the art and is described in my copending application just mentioned. In essence, if light polarized in the plane indicated by arrow 16 impinges upon the upper surface of rotator 10 along an optical axis 17 the light will pass through the rotator without change in its direction of polarization if source 14 is disconnected from electrodes 12 and 13. If, on the other hand, source 14 is connected as shown, so as to energize the rotator 10, the plane of polarization of light incident on the conductive coating 12 will be rotated 90° and emerge in the plane indicated by arrow 18.

Figure 2:
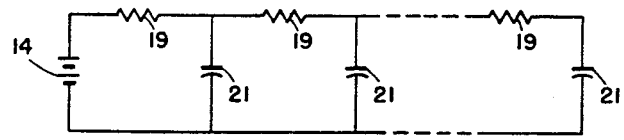
Figure 2 shows the electrical equivalent of the rotator of Figure 1.

For very low frequencies the rotation of light which passes through rotator 10 is the same at all points on the surface of the conductive coatings 12 and 13, but for high frequency operation where the potential source 14 may be connected and disconnected at a very high rate, the capacitive and resistive character of the rotator 10 must be taken in effect. This resistive and capacitive character is indicated by the circuit in Figure 2 which corresponds electrically to the rotator 10 of Figure 1. In Figure 2, each of the resistors 19 are actually incremental resistors which represent the resistance per unit length of the conductive coatings 12 and 13. Actually, each resistor 19 is the sum of the resistance per unit length of coatings 12 and 13.

Figure 3:
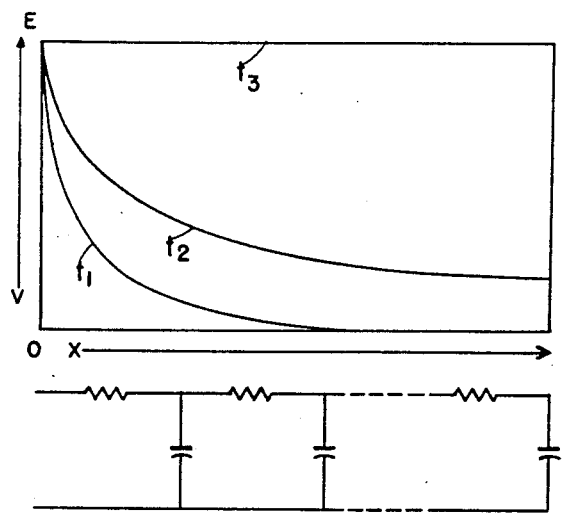
Figure 3 illustrates the voltage build up curves applicable to the electrical circuit of Figure 2.

It is well known in electrical circuit theory that at the instant the source 14 is connected to the electrodes 12 and 13, each of the capacitors 21 starts to charge up through such of the resistors 19 as lie between it and source 14. The voltage across the capacitors 21 is plotted in Figure 3 in which the abscissa represents the length of rotator 10 from left to right, and the ordinate indicates the voltage at any particular capacitor 21. At the time $t_1$ shortly after source 14 has been connected to the circuit, the voltage distribution in the circuit of Figure 2 (repeated for clarification directly below the curves) is indicated by the curve $t_1$ in Figure 3. It will be noticed that the left end of the circuit in Figure 2 and consequently the left hand end of rotator 10 in Figure 1 has reached its terminal voltage which is the voltage of source 14, while the voltage across the capacitors at the right hand end of the circuit in Figure 2 remains substantially at zero. Therefore, if uniform light polarized as indicated in Figure 1 were applied to the rotator 10 part of the light at the left hand end of the rotator would be shifted 90°, while light at the extreme right hand end would be transmitted substantially without change in its plane of polarization. At points between the extreme right and left hand ends, light emerging from the rotator 10 would be elliptically polarized to different degrees.

At a later moment of time, as indicated by curve $t_2$, intermediate capacitors have charged up while capacitors at the extreme right hand end of the circuit of Figure 2 are charged to a lesser degree. At a much later time, indicated by the curve $t_3$, all of the capacitors will have charged to the potential of source 14, and all the light will be shifted 90°.

Figure 4:
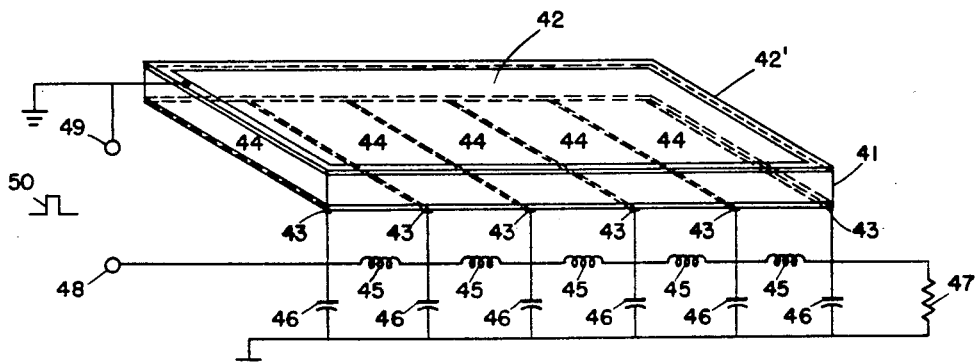
Figure 4 shows one embodiment of the invention including a light polarization rotator divided into elemental areas.
Figure 5:
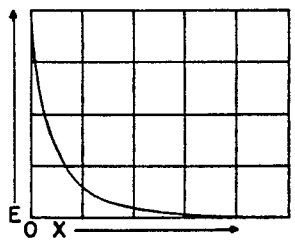
Figures 5, 6 and 7 show the voltage build up of the rotator of Figure 4.
Figure 6:
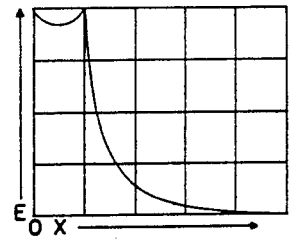
Figure 7:
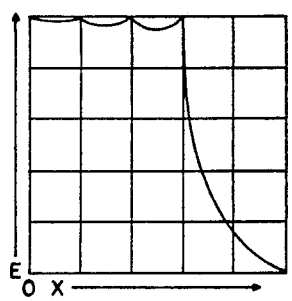

I make use of this phenomenon in my present invention in the following manner. Referring to Figure 4, there is shown an assembly similar to that shown in Figure 1. In this case, the slab 41 of electro-optic material is coated on the upper side with a low resistance transparent coating 42. Contact is made to this coating by means of a peripheral strip 42' of highly conductive material as pointed out above. It is also coated on the lower side with a medium resistance transparent coating which is traversed by parallel low resistance transparent strips 43 which have the effect of defining a plurality of areas 44 of medium resistance transparent conducting material. These low resistance transparent strips are each connected to the junction of an inductance 45 and a capacitor 46 forming a delay line which is terminated in its characteristic impedance 47. Upon application of a pulse 50 between terminals 48 and 49, the pulse travels down the delay line at a finite speed, energizing one after the other of the areas 44. These areas do not charge immediately as mentioned above in connection with Figure 1, and the curves of Figures 5, 6 and 7 illustrate the potential distribution when succeeding strips 43 are energized as the pulse 50 proceeds down the delay line.

It is thus seen how an approximation of a travelling wave of voltage may be obtained on the conductive coating. Obviously, the voltage may be wiped off in an analogous fashion by applying at terminal 48 a pulse of equal magnitude and opposite polarity from pulse 50 and delayed a time corresponding to the delay of one section or by progressively shorting each strip.

Knowing the voltage E across an electro-optical element the light transmission T may be readily computed from the formula $$T = \sin^2\left(\frac{\pi E}{2E_m}\right)$$

where $E_m$ is the voltage applied to the coatings in a conventional electro-optic shutter. Using the above equation it is seen that a ±10% change in voltage around $E_m$ produces only a ±2.4% change in transmission. A ±20% voltage change gives only a ±9.6% transmission change. Thus the unavoidable voltage "valleys" seen in Figures 6 and 7 cause far less pronounced brightness "valleys" than might be imagined. Without question voltage "valleys" of ±5% would not be discernable as brightness variations.

Figure 8:
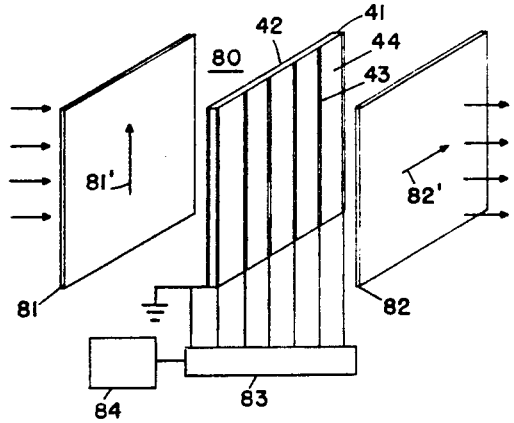
Figure 8 shows a complete electro-optic light filter which may be used as a focal plane shutter.

Figure 8 illustrates the use of my invention to provide an electronic optical focal plane shutter in which the device of Figure 4 indicated generally by reference character 80, is shown interposed between two plane polarizers 81 and 82 whose plane of polarization is shown by the arrows 81' and 82'. Connections are shown between the transparent conductive layer 42 on one side of the slab 41 of electro-optic material, the conductive transparent strips 43 on the opposite side thereof and a delay line shown diagrammatically as block 83 energized from a pulse generator 84. Incident light passing through plane polarizer 81 is polarized in the direction indicated by arrow 81'. If the shutter 80 is not energized, the light passes through without change of polarization. It then impinges on plane polarizer 82, where it is absorbed, so that no light is transmitted. If, however, one or more of the strips 43 are energized, the light in passing through shutter 80 is rotated through 90°, and is then transmitted through polarizer 82. It is thus seen how the transmitted light will be in the form of a narrow band sweeping from left to right.

It becomes obvious that if all the strips 43 are connected together, and are energized together, the entire surface will rotate the plane of light simultaneously and to the same degree.

While I have described in some detail certain specific embodiments of my invention, I do not wish to be limited thereby, but solely by the claims granted to me.

What is claimed is:

1. An electro-optic light polarization rotator comprising a first transparent conductive layer; a second transparent conductive layer divided into elemental sub-areas, each of said sub-areas being directly electrically connected to its adjoining sub-area by a corresponding plurality of transparent conductive electrodes of relatively high conductivity compared to the conductivity of said elemental sub-areas, each of said conductive electrodes being in electrical contact with each of said sub-areas, respectively; electro-optic material between said first and second layers; and means to apply energizing electrical potentials sequentially between said first layer and said electrodes of said plurality of conductive electrodes to produce rotation of light passing through said adjoining sub-areas in sequence to permit passage of light through said sub-areas progressively along one dimension of the rotator.

2. The device of claim 1 in which said means to apply an energizing electrical potential sequentially comprises an electrical delay line.

3. A shutter comprising light polarizing means and an electro-optic light polarization rotator, said rotator comprising a sheet of electro-optic material, a first transparent conductive coating on one surface of said sheet, a second transparent conductive coating on another surface of said sheet, said second transparent conductive coating having a plurality of connector electrodes thereon dividing said second coating into a plurality of areas, the conductivity of each of said connector electrodes being relatively high in comparison to the conductivity of said second conductive layer; and means to apply energizing electrical potentials sequentially between said first layer and said electrodes of said plurality of conductive electrodes to produce rotation of light passing through said adjoining sub-areas in sequence to permit passage of light through said sub-areas progressively along one dimension of the rotator.

4. The device of claim 3 in which said switching means comprises an electrical delay line.

5. A shutter comprising a plurality of sheets of light polarizing material and an electro-optic light polarization rotator which comprises a sheet of electro-optic material and first and second low resistance transparent conductive coatings on opposite surfaces of said sheet, the second of said coatings being divided into sub-areas, each of said sub-areas being directly electrically connected to its adjoining sub-area by a highly conductive electrode in contact with each of said areas, each of said electrodes having two conductivity areas with which it is in contact; and switching means to apply an energizing potential between said electrodes in sequence and the said first conductive coatings in order to rotate the plane of polarization of light passing through the areas in contact with the electrode to which said potential is applied differently from the polarization of light incident on others of said areas.

6. The device of claim 5 in which said switching means comprises an electrical delay line.

References Cited in the file of this patent

UNITED STATES PATENTS 2,670,402    Marks _____ Feb. 23, 1954